Feb. 8, 1966 R. SHAW, JR 3,233,466

PIEZOELECTRIC ACCELEROMETER

Filed June 24, 1963 7 Sheets-Sheet 1

INVENTOR.
RICHARD SHAW JR.
BY Herbert L. Davis
ATTORNEY

INVENTOR.
RICHARD SHAW JR.
BY Herbert L. Davis
ATTORNEY

PIEZOELECTRIC ACCELEROMETER

Filed June 24, 1963 7 Sheets-Sheet 3

INVENTOR.
RICHARD SHAW JR.
BY Herbert L. Davis
ATTORNEY

INVENTOR.
RICHARD SHAW JR.
BY Herbert L. Davis
ATTORNEY

INVENTOR.
RICHARD SHAW JR.
BY Herbert L. Davis
ATTORNEY

PIEZOELECTRIC ACCELEROMETER

Filed June 24, 1963

INVENTOR.
RICHARD SHAW JR.
BY Herbert L. Davis
ATTORNEY

INVENTOR.
RICHARD SHAW JR.
BY Herbert L. Davis
ATTORNEY

United States Patent Office 3,233,466

Patented Feb. 8, 1966

3,233,466

PIEZOELECTRIC ACCELEROMETER

Richard Shaw, Jr., Mahwah, N.J., assignor to The Bendix Corporation, Teterboro, N.J., a corporation of Delaware Filed June 24, 1963, Ser. No. 289,856
7 Claims. (Cl. 73—517)

This invention relates to a piezoelectric accelerometer and more particularly to a piezoelectric accelerometer device in which low frequency oscillations may be measured by their effect in modulating the frequency of a piezoelectric oscillator.

As has been heretofore well known, the piezoelectric effect is a phenomenon exhibited by piezoelectric substances of expansion along one axis and contraction along another axis when subjected to an electric field. The converse effect, whereby mechanical strains produce opposite charges on different faces of the piezoelectric substance, also obtains.

An object of the invention is to provide a vibrating plate including a piezoelectric substance and an electronic means operated thereby to measure the effects of low frequency accelerations thereon.

Another object of the invention is to provide an oscillator device of a laminated strip of piezoelectric material, the center of which device includes a thin sheet of an electrical conductive material and on each side of which is a relatively thick layer of a piezoelectric ceramic and on the outerside of the ceramic layers are two relatively thin layers of an electrical conductive material which may be sprayed thereon, and in which arrangement electrical connections are made to the two outer layers so that an electrical potential difference between the two connections causes one piezoelectric ceramic layer to expand lengthwise while the other piezoelectric ceramic layer contracts causing the strip to bend, and conversely, if the strip is bent by an applied moment, a voltage may be generated between the connections. Further, an electrical lead may be attached to the central electrical conductor strip and into an electrical control circuit so that a voltage generated between the central strip and one outer side layer is amplified and applied between the other outer side layer and the central conductor so that the arrangement may be such that the phase of the feedback may be adjusted to cause this electromechanical circuit to oscillate. In addition, such laminated piezoelectric strip may be supported at the middle of one edge while seismic mass may be attached to the middle of the opposite edge so that in response to accelerational forces this mass applies a moment to the laminated piezoelectric strip changing the frequency of oscillation thereof.

Another object of the invention is to provide means to discriminate between positive and negative accelerations applied to such laminated piezoelectric strip by providing two such assemblies, biased in opposite directions, so that frequency of oscillation of the one laminated piezoelectric strip will increase while the frequency of oscillation of the other laminated piezoelectric strip decreases upon positive and negative accelerations acting thereon, respectively.

Another object of the invention is to provide such an accelerational responsive laminated piezoelectric strip arrangement in which phase shifting networks and demodulators may be utilized to produce sinusoidal signals at beat frequency and ninety degrees out of phase with each other, and which signals may be applied to the windings of a two-phase synchronous motor of conventional type causing the shaft thereof to rotate through an angle proportional to velocity.

Another object of the invention is to provide a piezoelectric plate including three layers of metal between each of which layers of metal there is positioned a layer of a piezoelectric ceramic substance having the property that an electric field parallel to the thickness of the ceramic causes a change in the length thereof, and conversely, a tensile or compressive force applied to the ends of the piezoelectric ceramic substance develops an electric charge on the faces thereof, and which plate may be operatively connected in an electrical control circuit so as to effect a controlled flexural vibration of the piezoelectric plate, and which plate may be further mechanically arranged so that accelerational forces applied thereto along a sensitive axis thereof is effective to modify the frequency of the flexural vibration of the piezoelectric plate to provide electrical output signals through said circuit for effecting operation of suitable computer mechanism for indicating the prevailing velocity in response to the applied accelerational forces.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

In the drawings:

FIGURE 1 is a diagrammatic view illustrating the principle of measurement embodied in the invention in which a rectangular piezoelectric plate may be vibrated flexurally so that upon a moment, as indicated by the arrows, being applied to the plate tending to bend the plate in a direction perpendicular to the flexural vibration, there will be effected a change in the frequency of vibration.

FIGURE 2 shows an edge view of an oscillatory plate of a laminated piezoelectric material applicable for use in the invention and through the center of which there extends a thin sheet of an electrical conductive material having upon each side thereof a thicker ceramic layer of a piezoelectric material, while at the outer side of each of the respective piezoelectric ceramic layers are two very thin layers of electrical conductive material to which suitable electrical connections may be made so that an electrical potential difference between the two connections and the central electrical conductor causes one ceramic layer to expand lengthwise while the other ceramic layer contracts lengthwise causing the plate to bend, and conversely, as the plate is bent by an applied moment, an electrical charge will be generated between the connections.

FIGURE 3 is a wiring diagram of a control circuit including the laminated oscillatory plate of FIGURE 2 and showing the plate schematically connected in the circuit in which an electrical lead has been attached to the central conductor so that a voltage generated between the central conductor and the conductor at the outer side of one of the piezoelectric layers may be amplified through the control circuit and applied between the conductor at the outer side of the other piezoelectric layer and the central strip, as shown schematically in FIGURE 3 so as to cause the electromechanical circuit to oscillate.

Figure 8:
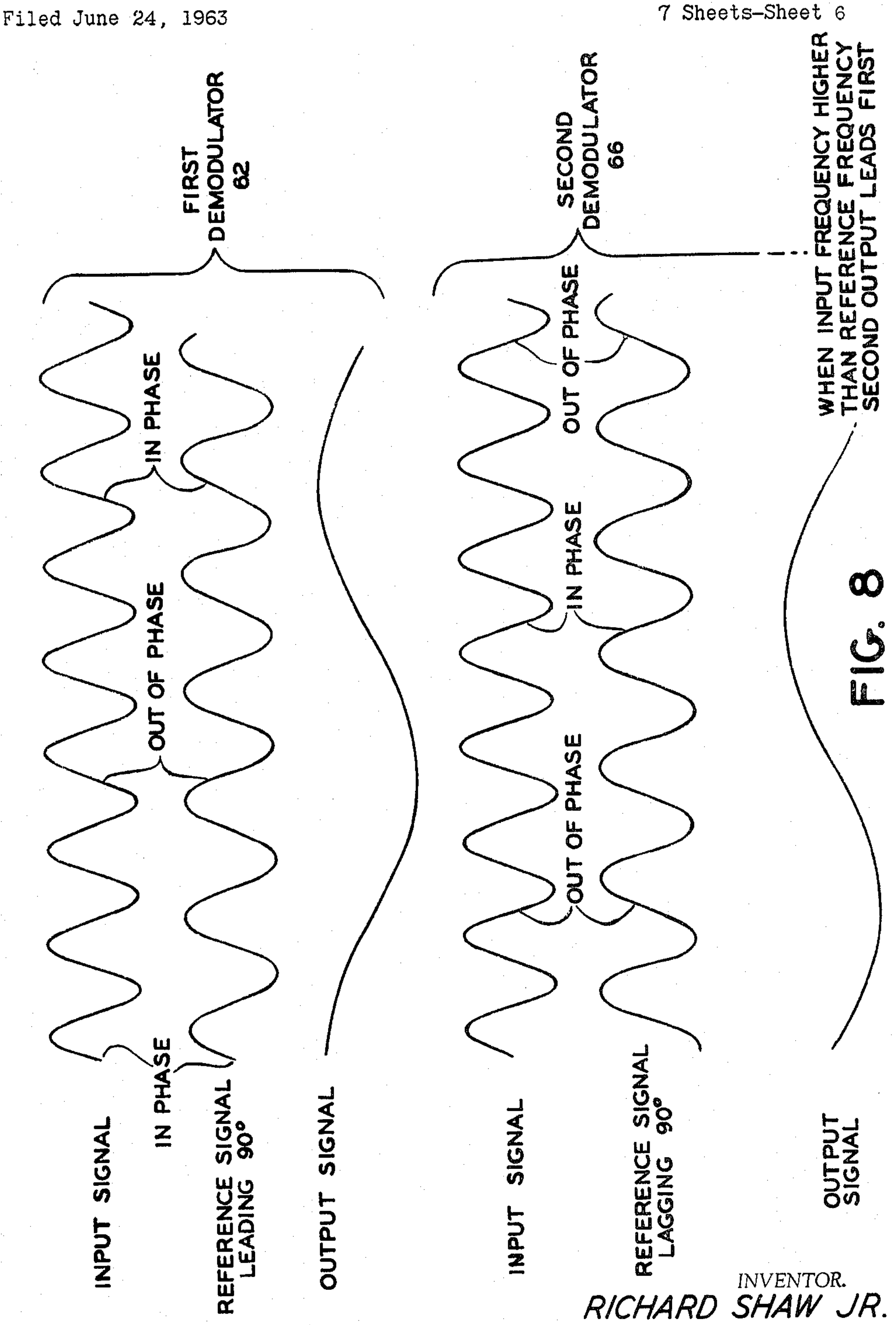

FIGURE 8 is a graphical illustration showing the relationship of the electrical phases of the input, reference, and output alternating current signals of the phase sensitive demodulator 62 in relationship to the input, reference and output alternating current signals of the phase sensitive demodulator 66 upon the alternating current input signal to the demodulators having a frequency greater than the frequency of the alternating current reference signals and showing the alternating current output signal from the second demodulator 66 leading the alternating current output signal from the first demodulator 62.

Figure 9:
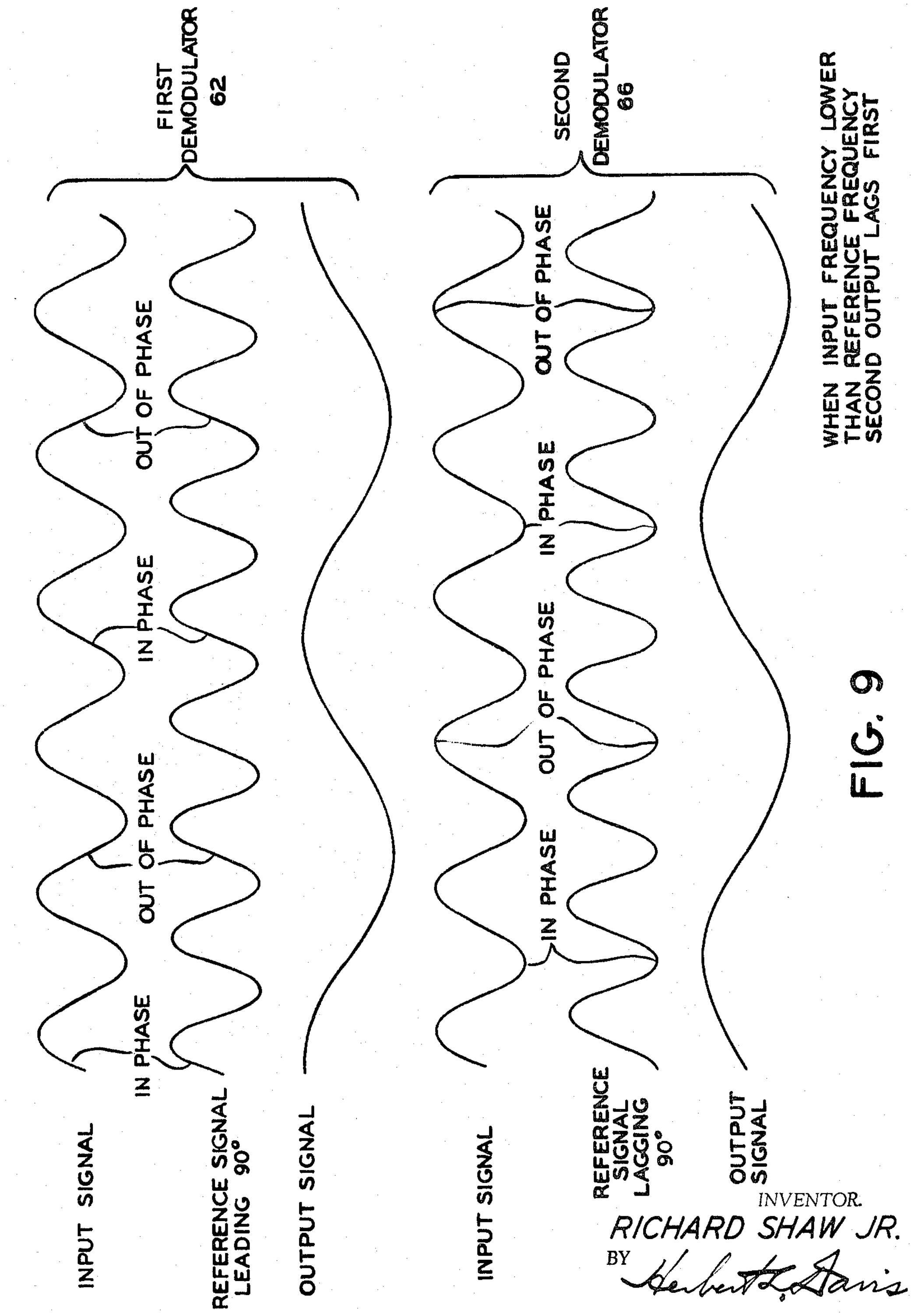

FIGURE 9 is a graphical illustration showing the relationship of the electrical phases of the input, reference and output alternating current signals of the phase sensitive demodulator 62 in relationship to the input, reference and output alternating current signals of the phase sensitive demodulator 66 upon the alternating current input signal to the demodulators having a frequency less than the frequency of the alternating current reference signals and showing the alternating current output signal from the second demodulator 66 lagging the alternating current output signal from the first demodulator 62.

Figure 1:
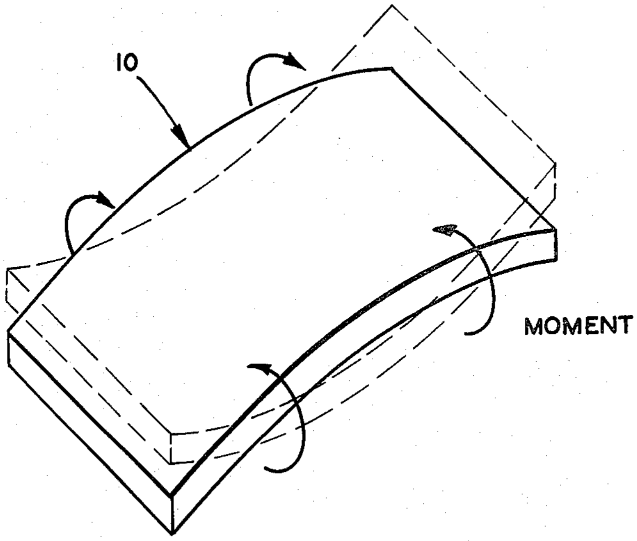

Referring to the drawing of FIGURE 1, it may be noted that piezoelectric materials have long been used to sense high frequency accelerations. In the present invention, however, low frequency accelerations are measured for effecting and modulating the frequency of a specifically designed piezoelectric oscillator.

The basic principle of measurement may be readily seen when it is borne in mind that upon a rectangular plate of any suitable elastic material, such as shown in FIGURE 1, being vibrated flexurally, a moment tending to bend the plate in a direction perpendicular to the flexure of vibration will change the frequency of vibration and to this extent may be likened to the principle by which the pitch of a musical saw is varied.

Furthermore, it has been found that certain new piezoelectric materials are well suited to effect this mode of operation. Thus, as shown in FIGURE 2, a laminated plate indicated generally by the numeral 10, and of a type supplied by the Clevite Corporation and known as a "bimorph bender" has been found to be particularly adapted for such use.

Figure 2:
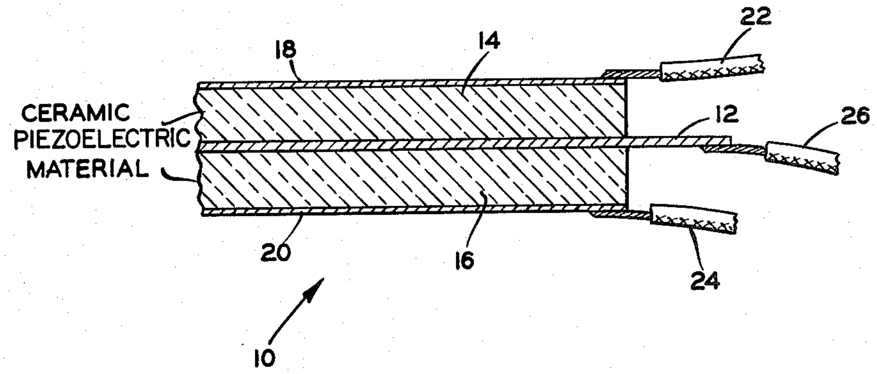

As shown in the drawing of FIGURE 2, in the center of the laminated plate there may be provided a thin sheet of an electrical conductive material indicated by the numeral 12 and on each side of the sheet 12, there may be provided a thicker layer of a piezoelectric ceramic material indicated by the numerals 14 and 16. The ceramic layers 14 and 16 may be a lead zirconate titanate piezoelectric material of a type produced by the Clevite Corporation.

On the outer side of each of the piezoelectric ceramic layers 14 and 16 are two very thin layers of electrical conductive material, indicated by the numerals 18 and 20, and which may be sprayed on the outer surfaces of the ceramic material 14 and 16, respectively.

In the usual mode of operation, electrical connections are made to the two outer layers by conductors 22 and 24, respectively, and to the central conductive sheet by the conductor 26. The arrangement is such that an electrical potential difference between the two electrical connections 22 and 24 and the connection 26 will cause one of the piezoelectric ceramic layers 14 or 16 to expand lengthwise while the other contacts, causing the sensor plate 10 to bend. Conversely, if the laminated plate 10 is bent by an applied moment, a voltage is generated between the connections 22–26.

Figure 3:
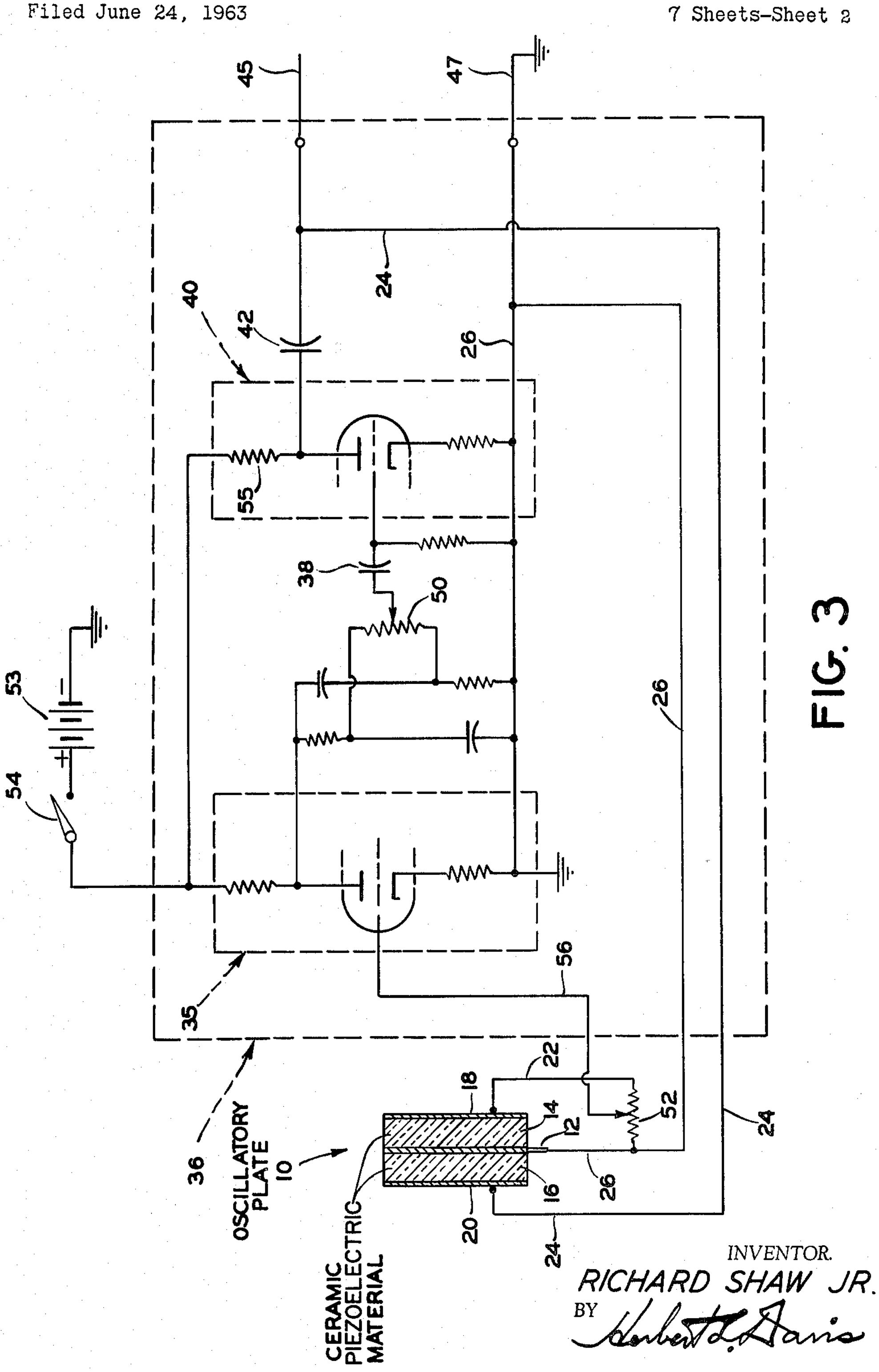

Thus, in the circuit, illustrated schematically in FIGURE 3, upon the laminated plate 10 being bent by an applied moment, as indicated by the dotted lines in FIGURE 1, there will be a voltage generated between the central strip 12 and the outside layer 18, which voltage will then be applied to the input of an oscillator control circuit 36, shown in FIGURE 3, and having a first stage amplifier 35 and through a coupler capacitor 38 to the input of a second stage amplifier 40. The output of the amplifier 40 is connected through a second coupling capacitor 42 and conductor 24 to the other outer side layer 20 and through conductor 26 to the center plate 12 of the laminated plate 10. The conductors 24 and 26 are further connected to output conductors 45 and 47 leading from the oscillator control circuit 36, as shown in FIGURE 3.

The phase of the feedback to be applied across the other outer side layer 20 and the center plate 12 may be adjusted by potentiometer 50 so as to cause this electromechanical circuit to oscillate. The second potentiometer 52 may be adjusted to vary the gain.

A source of electrical energy or battery 53 may be connected into the control circuit, as shown in FIGURE 3, by the operator closing a switch 54 whereupon a voltage is applied to one side 20 of the oscillatory plate 10 through a resistor 55, the coupling capacitor 42 and the conductor 24. This voltage will cause a lengthwise extension of the piezoelectric ceramic layer 16 which in turn causes the oscillator plate 10 to bend whereupon the center plate 12 bends and the second piezoelectric ceramic layer 14 is compressed generating a voltage wave that is applied to the grid of the first amplifier stage 35 through conductor 22, potentiometer 52 and a conductor 56.

Upon the phase-shifting potentiometer 50 being properly adjusted, the amplified voltage wave will be applied through the coupling capacitor 38 to the second stage amplifier 40 and in turn through the output thereof and coupling capacitor 42 to the first side 20 of the oscillator plate 10 just as the bending has completed its overshoot and is about to resume motion in the original direction.

The second cycle of flexure is thus reinforced by the amplified voltage wave and overshoots further than the first cycle. The amplitude of successive cycles increases until it is limited by air resistance, internal friction, etc.

The drawing of FIGURE 1 indicates the flexural vibration of the oscillatory plate 10 by showing its two extreme positions in dotted and solid lines. The basic concept upon which the device depends is the fact that a moment tending to flex the plate 10 about an axis perpendicular to the axis of flexural vibration will increase the frequency of vibration.

Figure 4:
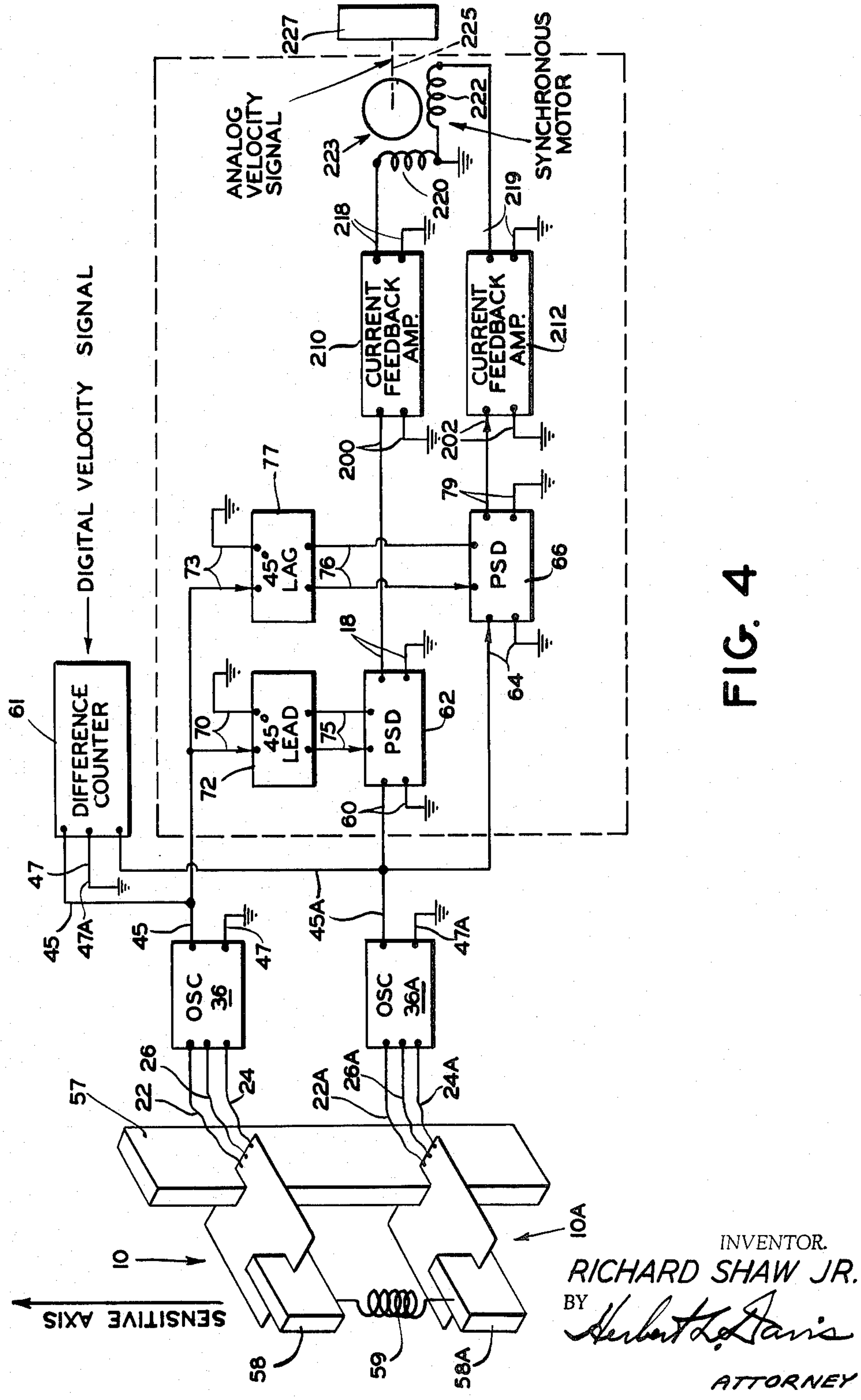
FIGURE 4 is a schematic diagram of a system illustrating the invention in which a pair of the control circuits of FIGURE 3 are shown operatively connected so as to discriminate between positive and negative accelerations and in which a pair of laminated oscillatory plates biased in opposite directions are operatively connected in the control circuits to effect the desired results.

In applying this principle to the sensing of accelerational forces, the plate 10 may be supported at the middle of one edge by a supporting member 57, as indicated schematically in FIGURE 4, while a seismic mass or weighted member 58 may be attached to the middle of the opposite edge. Thus, under acceleration, this mass or weighted member 58 will apply a moment to the plate 10 changing the frequency of oscillation thereof.

Further, in the arrangement shown by FIGURE 4, a pair of the oscillatory plates 10 and 10A of FIGURE 2 are mounted as cantilever beams with the mass or weighted members 58 and 58A, respectively, at the free end of each.

When the entire assembly is accelerated along the sensitive axis indicated by the arrow, the two masses 58 and 58A develop moments in the plates 10 and 10A that modify their frequencies of oscillation. A bias spring 59 applies to each plate 10 and 10A a moment greater than that produced by the largest anticipated acceleration, and the net effect of an acceleration is, therefore, to increase the moment on one oscillatory plate while decreasing that on the other oscillatory plate. Both plates 10 and 10A are vibrating flexurally due to the electromechanical action described previously. Consequently, acceleration causes the frequency of one to increase while the other decreases. The algebraic difference of the two frequencies is thus proportional to the applied accelerational force.

In order to discriminate between positive and negative accelerations, a pair of plate assemblies, such as shown in FIGURE 4, are provided in which like parts have been indicated by corresponding numerals to which is applied the suffix A. Thus, the mass 58 and the mass 58A are shown biased by a spring 59 in opposite directions and the arrangement is such that upon accelerational forces being applied thereto along a sensitive axis, indicated in FIGURE 4 by the arrow, the output frequency of the alternating current of the oscillator 36 of FIGURE 4, will increase while the output frequency of the alternating current of the other oscillator 36A, which may be of identical construction to that of the oscillator 36, will decrease. The algebraic difference between the two alternating current output frequencies is proportional to acceleration so that the beat frequency is proportional to acceleration and with greater accuracy than the frequency increment of either oscillator alone.

Connected across the output lines 45 and 47 of the oscillator 36 and the output lines 45A and 47A of the oscillator 36A is a difference counter mechanism 61 which may be of a conventional type.

In most applications of the invention, the quantity of interest may be velocity rather than acceleration. An advantage of this device is that no integrator is necessary and the difference counter mechanism 61 may be arranged to compute the algebraic difference between the number of cycles of the alternating current generated by the two oscillators 36 and 36A which is proportional to velocity.

Thus, the difference counter mechanism 61, shown in FIGURE 4, may include two counters and a subtractor which would periodically determine the difference between the computations of the two registers. Such a combination may be readily assembled from common "building blocks" of digital computers. In most missile applications, the accelerometer signal goes into a suitable computer. Thus the computations of the two counters may be fed directly into such a computer to perform the subtraction, thus eliminating duplication of components.

Thus, it will be seen that the accelerometer may readily provide a digital velocity signal through the counter mechanism 61 in the manner described above. However, should an analog velocity signal be required, there may be generated a rotating magnetic field whose angular velocity is proportional to the difference between the two frequencies by the means hereinafter described so as to provide and analog velocity signal.

The means for generating a rotating magnetic field having an angular velocity proportional to the difference between the frequencies of the alternating current outputs from the variable oscillators 36 and 36A may be of a type described and claimed in U.S. application Serial No. 289,297, filed June 20, 1963 by Richard Shaw, Jr., and assigned to The Bendix Corporation, assignee of the present invention.

Figure 5:
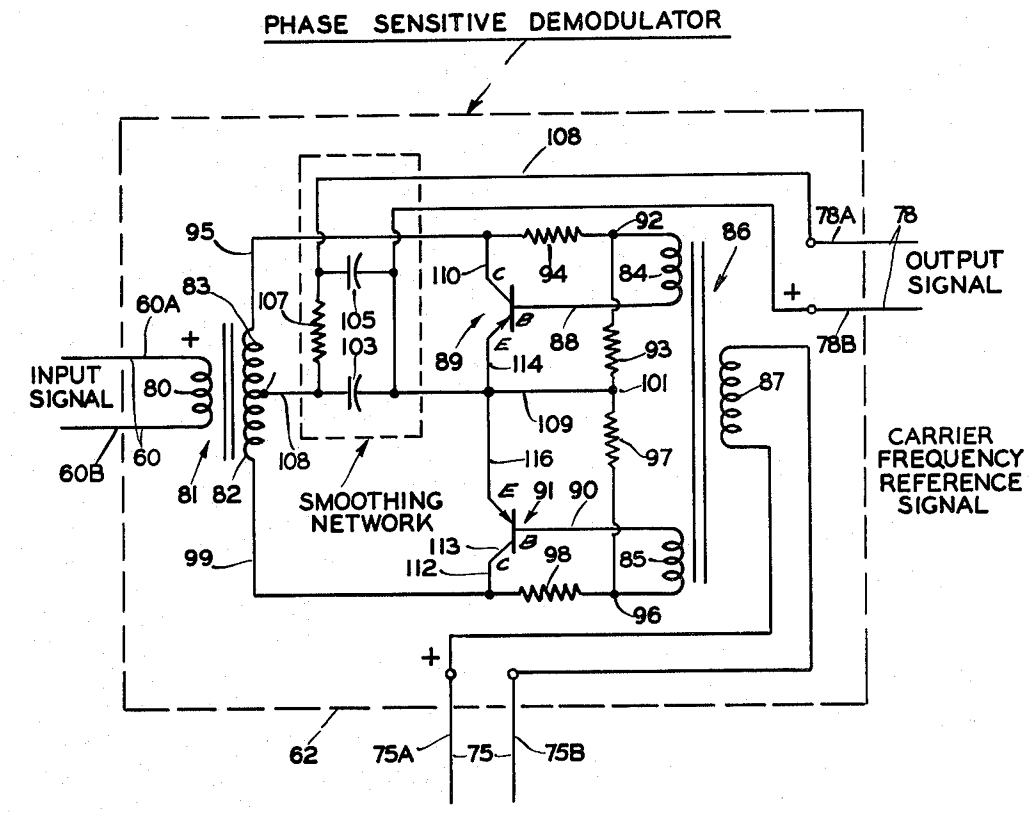
FIGURE 5 is a wiring diagram of a phase sensitive demodulator for use in the system of FIGURE 4.

Thus, the oscillator 36A has output lines 45A and 47A connected to input terminals 60 of a phase sensitive demodulator 62, shown in FIGURE 5, and to the input terminals 64 of a second phase sensitive demodulator 66, as shown in FIGURE 4.

Figure 6:
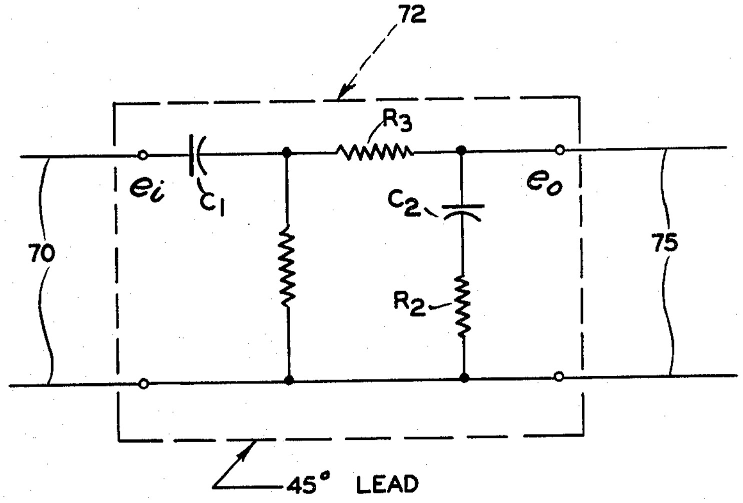
FIGURE 6 is a wiring diagram of a 45 degree phase shifting lead network for use in the system of FIGURE 4.
Figure 7:
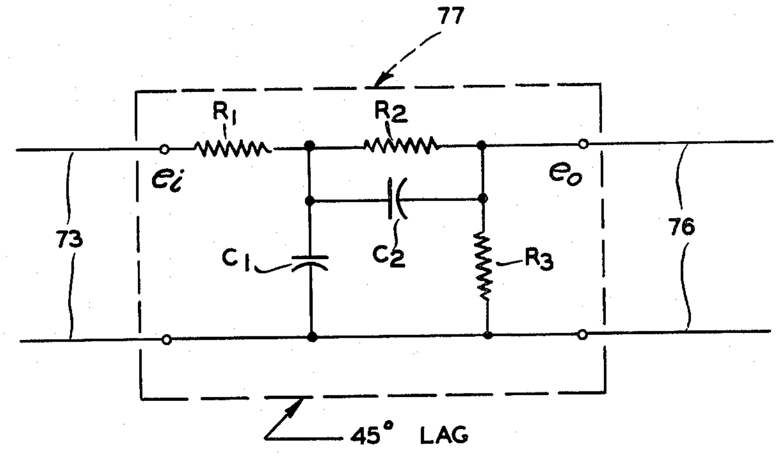
FIGURE 7 is a wiring diagram of a 45 degree phase shifting lag network for use in the system of FIGURE 4.

Further, the output lines 45 and 47 of the oscillator 36 are connected to input terminals 70 of a forty-five degree lead network 72 having output lines 75, as shown in FIGURE 6, and to the input terminals 73 of a forty-five degree lag network 77 having output lines 76, as shown in FIGURE 7.

*Phase sensitive demodulator*

The phase sensitive demodulator 62 and the phase sensitive demodulator 66 may be of identical structure and therefore, a description of the one demodulator circuit 62 will suffice for an understanding of the demodulator circuit 66. The structure of the phase sensitive demodulator 62 is shown in FIGURE 5 in which an output signal from the oscillator 36 is applied across the input lines 60 of the phase sensitive demodulator 62.

The phase sensitive demodulator is a combination of electrical components which normally receives a modulated alternating current signal and an alternating current reference signal. Its function is to provide an output signal, the magnitude of which is proportional to the magnitude of the input signal while the polarity of the output signal depends on the phase of the input signal relative to the reference signal.

FIGURE 5 shows one circuit that accomplishes this result. Although the circuit may be well known, the present application thereof is novel. A review of its basic operating principles may, therefore, be in order.

In the phase sensitive demodulator, shown in FIGURE 5, the input lines 60 are connected to a primary winding 80 of a transformer 81 having secondary windings 82 and 83 forming the first and second arms of a bridge circuit including as third and fourth arms thereof secondary windings 84 and 85 of a transformer 86. The primary winding 87 of the transformer 86 is connected across the reference lines 75.

The secondary winding 84 is connected by a conductor 88 to the base of a transistor 89 while the secondary winding 85 is connected through a conductor 90 to a base of a transistor 91. The other end of the secondary winding 84 is connected to a point 92 between resistor elements 93 and 94 which are connected through a conductor 95 to one end of the secondary winding 83 of the transformer 81. The other end of the secondary winding 85 is connected to a point 96 between resistor elements 97 and 98 which are in turn connected through a conductor 99 to the opposite end of the secondary winding 82 of the transformer 81.

The windings 82 and 83 are connected at a center point 100 while the resistors 93 and 97 are connected at a center point 101. The center points 100 and 101 are coupled by capacitors 103 and 105, and resistor 107 forming a smoothing network for output signals applied through conductors 108 and 109 leading from the points 100 and 101, respectively, to the output leads 78.

The transistor 89 has a collector element connected by a conductor 110 to the line 95 while the transistor 91 has a collector element connected by a conductor 112 to the conductor 99. The emitter elements of the transistors 89 and 91 are connected respectively by conductors 114 and 116 to the conductor 109 leading from the center point 101.

The arrangement then of the phase sensitive demodulator of FIGURE 5 is such that the conductivity of the transistor 89 is controlled by the polarity of the charge applied to the collector element through the conductor 110 by the secondary windings of the transformers 81 and 86 while the conductivity of the transistor 91 is controlled by the charge applied through the conductor 112 by the transformers 81 and 86.

In the operation of the phase sensitive demodulator, it may be seen that the input signal applied to the transformer 81 by the conductors 60 may or may not be in phase with the reference signal applied to the secondary winding 87 of the transformer 86 through conductors 75.

Assume first that the input signal is in phase with the reference signal, so that input conductor 60*a* is positively charged at the same time as reference conductor 75A. The polarity of transformer 81 is such that conductor 95 will be positive and 99 negative when 60A is positive. The polarities of the windings of transformer 86 are so arranged that transistor 89 is conducting and 91 nonconducting when conductor 75A is positive. Therefore, output conductor 78B will be positive.

Now consider the situation half a cycle later, input conductor 60A and reference conductor 75A are both negative. Therefore, conductor 99 is positive and transistor 91 conducting. The negative potential of conductor 95 is blocked by transistor 89, which is now nonconducting. Output conductor 78B is therefore still positive.

By similar reasoning, it is apparent that when conductors 60A and 75A have opposite polarity, 78B is negative.

In the present application, both the input and the reference terminals receive signals of essentially constant amplitude but varying frequency. Obviously, the phase of the input relative to the reference is varying continuously. It has been shown that the polarity of output terminal 78B is positive when the input is in phase with the reference signal and negative when input and reference are out of phase. When the input leads or lags the reference by 90 degrees, the potential of conductor 95 will average zero while transistor 89 is conducting and the potential of conductor 99 will likewise average zero while transistor 91 is conducting. Thus the potential of 78B relative to 78A alternates at a frequency equal to the difference between the input and reference frequencies. Ripple in the output signal is effectively eliminated by the smoothing network shown in the diagram including capacitors 103 and 105 and resistor 107. This application of the phase sensitive demodulators 62 and 66 may be clarified by reference to the wave forms shown in FIGURES 8 and 9.

As heretofore explained, the phase sensitive demodulator 66 has a corresponding structure to that of the phase sensitive demodulator 62 in which the input lines 64 of the demodulator 66 correspond to the input lines 60 of the demodulator 62; the reference signal lines 76 of the demodulator 66 correspond to the reference signal lines 75 of the demodulator 62; and the output lines 79 of the demodulator 66 correspond to the output lines 78 of the demodulator 62.

*Phase shifting networks*

The carrier reference signal applied across the reference lines 75 of the demodulator 62 and the reference signal applied across the reference lines 76 of the demodulator 66 are in turn provided by the 45 degree lead network 72 and the 45 degree lag network 77, respectively.

The two phase shifting networks illustrated in FIGURES 6 and 7 are arranged to provide a 45 degree lead and a 45 degree lag, respectively. In both cases the networks 72 and 77 are so arranged that the phase shift is insensitive to frequency over a considerable or normal operating range. The several components of the 45 degree network of FIGURE 6 may have the following indicated values in which $\omega$ is the average frequency generated by the oscillators 32 and 34 expressed in radians per second:

$$R_1C_1=\frac{1}{20\omega}$$

$$R_2C_2=\frac{1}{\sqrt{6}\omega}$$

$$R_3=5R_2$$

$$R_3=\gg R_1$$

while the several components of the 45 degree lag network of FIGURE 7 may have the following indicated values in which $\omega$ is the average frequency:

$$R_1C_1=\frac{20}{\omega}$$

$$R_2C_2=\frac{\sqrt{6}}{\omega}$$

$$R_3=\frac{R_2}{5}$$

$$R_2=\gg R_1$$

The respective lead and lag networks of FIGURES 6 and 7 follow conventional circuit designs, and therefore, a detail explanation thereof is not deemed necessary.

*Analog velocity signal*

The output lines 78 of demodulator 62 and the output lines 79 of demodulator 66 are connected to the input lines 200 and 202, respectively, of suitable current feedback amplifiers 210 and 212, the outputs of which are connected, respectively, through output lines 218 and 219 to control windings 220 and 222, respectively, of a two-phase synchronous motor 223.

The phase shifting networks 72 and 77 so control the demodulators 62 and 66 as to produce two sinusoidal signals having an out-of-phase relationship with each other dependent upon the accelerational forces applied to the masses 58 and 58A. These two signals are then applied to the windings of the synchronous motor 223, causing a shaft 225 to rotate through an angle proportional to the velocity for operating a suitable velocity indicator 227 of conventional type.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. The combination comprising a plate oscillatable at a variable frequency,
   - said plate including a first electrical conductor,
   - second and third electrical conductors arranged in spaced relation and at opposite sides of the first electrical conductor,
   - a first layer of piezoelectric ceramic material operatively connected between the first and second conductors,
   - a second layer of a piezoelectric ceramic material operatively connected between the first and third conductors,
   - means for applying a first voltage across the first and second electrical conductors to cause the first layer of piezoelectric ceramic material to expand lengthwise causing the first conductor to bend in a first sense so as to cause the second layer of piezoelectric ceramic material to contract so as to generate a second voltage between the first and third conductors,
   - an electrical feedback circuit controlled by said second voltage for applying a voltage across the first and second conductors to cause an effective oscillation of the plate in said first sense,
   - means for supporting the plate at one edge thereof,
   - and a mass mounted at an opposite edge of the plate and responsive to accelerational forces acting transverse said opposite edge of the plate to exert a moment on the plate in a second sense for modulating the frequency of oscillation of the plate.

2. In an accelerometer, the combination comprising a pair of plates oscillatable at a variable frequency, each of said plates including a first electrical conductor,
second and third electrical conductors arranged in spaced relation at opposite sides of the first electrical conductor,
a first layer of a piezoelectric material operatively connected between the first and second conductors,
a second layer of a piezoelectric material operatively connected between the first and third conductors,
variable oscillator means including electrical feedback circuit means for applying voltages across the first and second electrical conductors of each plate to cause the first layer of piezoelectric ceramic material to expand lengthwise and the plate to bend about a first axis so as to cause the second layer of piezoelectric ceramic material to contract so as to generate voltage pulses between the first and third conductors for controlling the electrical feedback circuit means,
said electrical feedback circuit means being under control of said generated voltage pulses for applying succeeding voltage pulses across the first and second conductors to cause oscillation of the plates about the first axes of said plates,
said variable oscillator means having electrical outputs leading from the feedback circuit means so as to provide alternating current signal outputs or frequencies varying with the frequencies of the oscillations of said plates,
a pair of weighted members,
means for supporting each of the oscillating plates at one edge thereof,
one of said weighted members being mounted at an opposite edge of each of the plates,
said weighted members being responsive to accelerational forces acting in a sense transverse the opposite edges of said plates for exerting a moment on said plates at said opposite edges thereof tending to flex the plates about second axes extending perpendicular to the first axes of said plates for modulating the frequencies of oscillation of the plates in opposite senses,
and means operable by the alternating current signal outputs from the variable oscillator means for effecting a velocity signal.

3. The combination defined by claim 2 in which said last-mentioned means includes means for computing the difference between the frequencies of the oscillation of said output signals to provide a velocity signal in accordance with said difference.

4. In an accelerometer, the combination comprising a pair of plates oscillatable at a variable frequency,
each of said plates including a first electrical conductor,
second and third electrical conductors arranged in spaced relation at opposite sides of the first electrical conductor,
a first layer of a piezoelectric material operatively connected between the first and second conductors,
a second layer of a piezoelectric material operatively connected between the first and third conductors,
variable oscillator means including electrical feedback circuit means for applying voltages across the first and second electrical conductors of each plate to cause the first layer of piezoelectric material to expand lengthwise and the plate to bend about a first axes so as to cause the second layer of piezoelectric material to contract so as to generate voltage pulses between the first and third conductors for controlling the electrical feedback circuit means,
said electrical feedback circuit means being under control of said generated voltage pulses for applying succeeding voltage pulses across the first and second conductors to cause oscillation of the plates about the first axes of said plates, said variable oscillator means having electrical outputs leading from the feedback circuit means,
one of said outputs providing an alternating current signal output of a frequency varying with the frequency of the oscillation of one of said plates,
another of said outputs providing an alternating current signal output of a frequency varying with the frequency of the oscillation of the other of said plates,
a pair of weighted members,
means for supporting each of the oscillatable plates at one edge thereof,
one of said weighted members being mounted at an opposite edge of each of the plates,
said weighted members being responsive to accelerational forces acting in a sense transverse the opposite edges of said plates for exerting a moment on said plates at said opposite edges thereof tending to flex the plates about second axes extending perpendicular to the first axes of said plates for modulating the frequencies of oscillations of the plates in opposite senses,
phase sensitive demodulator means,
means operatively connecting one of the alternating current signal outputs from the variable oscillator means to the phase sensitive demodulator means,
phase shifting means,
means operatively connecting another of the alternating current signal outputs from the variable oscillator means to said phase shifting means,
said phase shifting means being operatively connected for controlling said phase sensitive demodulator means,
said demodulator means providing variable frequency alternating current output control signals of shifting phase relationship depending upon the sense and magnitude of the accelerational forces acting on said masses,
and a two-phase motor operative by said control signals of shifting phase relationship for effecting a rotating magnetic field varying in sense and magnitude with said accelerational forces.

5. In an accelerometer, the combination comprising a pair of plates oscillatable at a variable frequency,
each of said plates including a first electrical conductor,
second and third electrical conductors arranged in spaced relation at opposite sides of the first electrical conductor,
a first layer of a piezoelectric material operatively connected between the first and second conductors,
a second layer of a piezoelectric material operatively connected between the first and third conductors,
variable oscillator means including electrical feedback circuit means for applying voltages across the first and second electrical conductors of each plate to cause the first layer of piezoelectric ceramic material to expand lengthwise and the plate to bend about a first axis so as to cause the second layer of piezoelectric ceramic material to contract so as to generate voltage pulses between the first and third conductors for controlling the variable oscillator means,
said electrical feedback circuit means being under control of said generated voltages pulses for applying succeeding voltage pulses across the first and second conductors to cause oscillation of the plates about the first axes of said plates,
said variable oscillator means having electrical outputs leading from the feedback circuit means,
one of said outputs providing an alternating current signal output of a frequency varying with the frequency of the oscillation of one of said plates,
another of said outputs providing an alternating current signal output of a frequency varying with the frequency of the oscillation of the other of said plates, a pair of weighted members, means for supporting each of the oscillatable plates at one edge thereof, one of said weighted members being mounted at an opposite edge of each of the plates, said weighted members being responsive to accelerational forces acting in a sense transverse the opposite edges of said plates for exerting a moment on said plates at said opposite edges thereof tending to flex the plates about second axes extending perpendicular to the first axes of said plates for modulating the frequencies of oscillation of the plates in opposite senses, phase sensitive demodulator means, means operatively connecting one of the alternating current signal outputs from the variable oscillator means to the phase sensitive demodulator means, phase shifting means, means operatively connecting the other of the alternating current output signal outputs from the variable oscillator means to said phase shifting means, said phase shifting means being operatively connected in controlling relation to said phase sensitive demodulator means, said demodulator means providing variable frequency alternating current output control signals of shifting phase relationship depending upon the sense and magnitude of the accelerational forces acting on said weighted members, a two-phase motor operative by said control signals of shifting phase relationship for effecting a rotating magnetic field varying in sense and magnitude with said accelerational forces to provide an analog velocity signal, and means operable by the alternating current signal outputs from the variable oscillator means for computing the difference between the frequencies of the oscillations of said output signals to provide a velocity signal in accordance with said difference.

6. In an accelerometer, the combination comprising a pair of plates oscillatable at a variable frequency, each of said plates including a first electrical conductor, second and third electrical conductors arranged in spaced relation at opposite sides of the first electrical conductor, a first layer of a piezoelectric ceramic material operatively connected between the first and second conductors, a second layer of a piezoelectric ceramic material operatively connected between the first and third conductors, a variable oscillator means including electrical feedback circuit means for applying voltages across the first and second electrical conductors of each plate to cause the first layer of piezoelectric material to expand lengthwise and the plate to bend about a first axis so as to cause the second layer of piezoelectric material to contract so as to generate voltage pulses between the first and third conductors for controlling the electrical feedback circuit means, said electrical feedback circuit means being under control of said generated voltage pulses for applying succeeding voltage pulses across the first and second conductors to cause effective oscillation of the plates about the first axes of said plates, said oscillator means including alternating current outputs leading from the feedback circuit means, one of said outputs providing an alternating current signal output having a frequency varying with the frequency of oscillation of one of the plates, another of said outputs providing an alternating current signal output of a frequency varying with the frequency of the oscillation of the other of said plates, a pair of weighted members, means for supporting each of the oscillating plates at one edge thereof, one of said weighted members being mounted at an opposite edge of each of said plates and responsive to accelerational forces, said weighted members being responsive to accelerational forces acting in a sense transverse the opposite edges of said plates for exerting a moment on said plates at said opposite edges thereof tending to flex the plates about second axes extending perpendicular to the first axes of said plates for modulating the frequencies of oscillation of the plates in opposite senses, a pair of phase sensitive demodulators, means operatively connecting one of the alternating current signal outputs from the variable oscillator means to an input of each of said pair of phase sensitive demodulators, a pair of phase shifting networks, means operatively connecting another of the alternating current signal outputs from the variable oscillator means to an input of each of said pair of phase shifting networks, one of said pair of phase shifting networks providing an alternating current output having a phase in leading relationship relative to the phase of the alernating current input thereto, the other of said pair of phase shifting networks providing an alternating current output having a phase in lagging relationship relative to the phase of the alternating current input thereto, each of the phase sensitive demodulators providing a variable phase alternating current output signal, means for operatively connecting the alternating current output of one of said phase shifting networks to one of the phase sensitive demodulators for controlling the phase of the alternating current output from said one demodulator, means for operatively connecting the alternating current output of the other of said phase shifting networks to the other of the phase sensitive demodulators for controlling the phase of the alternating current output from said other demodulator, a two-phase motor, and means operatively connecting the variable phase alternating current output signals from said pair of phase sensitive demodulators to said motor so as to control the operation thereof in accordance with the sense and magnitude of the accelerational forces acting upon said weighted members.

7. The combination comprising an oscillatable plate including first and second layers of piezoelectric material, electronic means to cause one of said layers to expand lengthwise and the other to contract lengthwise for effecting oscillation of the plate in a first sense at a variable frequency, means for supporting the plate at one edge thereof, a mass mounted at an opposite edge of the plate and responsive to accelerational forces acting transverse said opposite edge of the plate to exert a moment on the plate in a second sense for changing the frequency of oscillation of the plate effected by the electronic means, said electronic means providing an alternating current output having a frequency variable with the accelerational forces applied to said mass.

(References on following page)

References Cited by the Examiner

UNITED STATES PATENTS

| | | | |
|---|---|---|---|
| 1,866,267 | 7/1932 | Nicolson | 310—8.4 |
| 1,975,516 | 10/1934 | Nicolson | 310—8.4 |
| 2,272,984 | 2/1942 | Ritzmann | 73—517 |
| 2,364,681 | 12/1944 | Wright | 310—8.4 |
| 2,371,626 | 3/1945 | Kecskemeti | 73—503 |
| 2,614,416 | 10/1952 | Hollmann | 73—517 |
| 2,725,492 | 11/1955 | Allan | 73—517 |
| 2,728,868 | 12/1955 | Peterson | 73—517 |
| 2,809,524 | 10/1957 | Masterson | 73—382 |
| 2,984,111 | 5/1961 | Kritz | 73—517 |

FOREIGN PATENTS

| | | |
|---|---|---|
| 789,611 | 1/1958 | Great Britain. |
| 861,325 | 2/1961 | Great Britain. |

RICHARD C. QUEISSER, *Primary Examiner.*

JAMES J. GILL, *Examiner.*